United States Patent
Xu et al.

(10) Patent No.: US 7,729,603 B2
(45) Date of Patent: Jun. 1, 2010

(54) RESOLUTION ADJUSTMENT FOR MINIATURE CAMERA

(75) Inventors: Jing Xu, Irvine, CA (US); Roman C. Gutierrez, Arcadia, CA (US); Tony K. Tang, Glendale, CA (US)

(73) Assignee: Siimpel Corporation, Arcadia, CA (US)

( * ) Notice: Subject to any disclaimer, the term of this patent is extended or adjusted under 35 U.S.C. 154(b) by 688 days.

(21) Appl. No.: 11/219,410

(22) Filed: Sep. 2, 2005

(65) Prior Publication Data

US 2006/0198622 A1 Sep. 7, 2006

Related U.S. Application Data

(60) Provisional application No. 60/697,476, filed on Jul. 7, 2005, provisional application No. 60/657,261, filed on Feb. 28, 2005.

(51) Int. Cl.
*G03B 3/00* (2006.01)
*G03B 13/00* (2006.01)
*G02B 5/04* (2006.01)

(52) U.S. Cl. ............... 396/89; 348/345; 359/823

(58) Field of Classification Search ............. 396/89, 396/91, 92, 349, 72, 76–79, 81, 82, 87, 101; 359/362–435, 676, 683
See application file for complete search history.

(56) References Cited

U.S. PATENT DOCUMENTS

| | | | | | |
|---|---|---|---|---|---|
| 2,033,596 | A | * | 3/1936 | Sussman | 359/673 |
| 3,065,671 | A | * | 11/1962 | Johnson et. al. | 359/734 |
| 5,589,989 | A | * | 12/1996 | Estelle et al. | 359/785 |
| 5,822,625 | A | * | 10/1998 | Leidig et al. | 396/77 |
| 6,115,552 | A | * | 9/2000 | Kaneda | 396/82 |
| 6,208,809 | B1 | * | 3/2001 | Kanai et al. | 396/30 |
| 6,278,844 | B1 | * | 8/2001 | Takeshita | 396/85 |
| 6,504,958 | B1 | * | 1/2003 | Suzuki | 382/255 |
| 6,914,635 | B2 | * | 7/2005 | Ostergard | 348/374 |
| 7,031,071 | B2 | * | 4/2006 | Nishioka | 359/676 |
| 7,403,344 | B2 | * | 7/2008 | Xu et al. | 359/779 |
| 2004/0076416 | A1 | * | 4/2004 | Mihara | 396/72 |
| 2004/0189862 | A1 | * | 9/2004 | Gustavsson et al. | 348/376 |
| 2005/0002665 | A1 | * | 1/2005 | Ito et al. | 396/349 |
| 2005/0024748 | A1 | * | 2/2005 | Amanai | 359/774 |

OTHER PUBLICATIONS

Akihiro Koga et al.; "Electrostatic Linear Microactuator Mechanism for Focusing a CCD Camera"; Journal of Lightwave Technology, vol. 17, No. 1; p. 43-47; Jan. 1999.

* cited by examiner

*Primary Examiner*—Melissa J Koval
(74) *Attorney, Agent, or Firm*—Haynes and Boone, LLP

(57) ABSTRACT

A method and system for enhancing the resolution of a camera are disclosed. For example, a single lens can be placed at a predetermined position and the position of a lens assembly can be adjusted so as to enhance the resolution of the camera. The single lens can then be moved so as to effect focusing of the camera while the position of the lens assembly tends to maintain enhanced resolution thereof.

35 Claims, 16 Drawing Sheets

FIG. 4
(prior art)

```
┌─────────────────────────────────────────┐
│   MOVE LENS ASSEMBLY TO FOCUS CAMERA.   │
└─────────────────────────────────────────┘
                    └── 31
```

FIG. 5

```
   ┌─ 44                              41 ─┐
┌──┼──────────────────────────────────────┼──┐
│  ┌─────────────────────────────────────┐   │
│  │ POSITION SINGLE LENS AT MAXIMUM     │   │
│  │ FOCUS DISTANCE (INFINITY).          │   │
│  └─────────────────────────────────────┘   │
│                    ↓                        │
│  ┌─────────────────────────────────────┐   │
│  │ ADJUST BOTH LENS ASSEMBLY AND SINGLE│   │
│  │ LENS FOR SHARPEST IMAGE USING       │   │
│  │ MODULATION TRANSFER FUNCTION (MTF). │   │
│  └─────────────────────────────────────┘   │
└────────────────────┬──────────────────┬────┘
       43 ─┐         ↓              42 ─┘
┌─────────────────────────────────────────┐
│      MOVE SINGLE LENS TO FOCUS CAMERA.  │
└─────────────────────────────────────────┘
```

| Surface No. | Type | Comment | Curvature of Radius (mm) | Thickness (mm) | Index of Refraction (N) | V-Number | Diameter (mm) |
|---|---|---|---|---|---|---|---|
| 1 | STANDARD | Aperture | Inf | 0 | | | 1.840 |
| 2 | STANDARD | | 2.664 | 1.222 | 1.755 | 52.3228 | 3.000 |
| 3 | STANDARD | | -14.091 | 0.12 | | | 3.000 |
| 4 | STANDARD | | -3.895 | 0.34 | 1.69895 | 30.0505 | 3.000 |
| 5 | STANDARD | | 2.830 | 0.17 | | | 3.000 |
| 6 | STANDARD | | 6.128 | 0.97 | 1.755 | 52.3228 | 3.000 |
| 7 | STANDARD | | -3.319 | 1.2 - 1.53 | | | 3.000 |
| 8 | EVENASPH | | -2.504 | 2.388 | 1.525279 | 55.95076 | 3.500 |
| 9 | EVENASPH | | -9.888 | 0.498 - 0.168 | | | 6.000 |
| 10 | STANDARD | Imager | Inf | 0 | | | 6.024 |

FIG. 8

| Surface 8 | |
|---|---|
| | Nominal Value |
| r (mm) | -2.504 |
| k | 0 |
| A4 | 3.52151500E-03 |
| A6 | -4.62830000E-02 |
| A8 | 4.96300000E-02 |
| A10 | -2.89420000E-02 |
| A12 | 8.34182000E-03 |
| A14 | -9.42837700E-04 |
| Surface 9 | |
| r (mm) | -9.888 |
| k | 0 |
| A4 | 4.19450000E-02 |
| A6 | -3.09500000E-02 |
| A8 | 8.35002200E-03 |
| A10 | -1.21351200E-03 |
| A12 | 9.26702600E-05 |
| A14 | -2.91798000E-06 |

*FIG. 9*

| Surface No. | Type | Comment | Curvature of Radius (mm) | Thickness (mm) | Index of Refraction (N) | V-Number | Diameter (mm) |
|---|---|---|---|---|---|---|---|
| 1 | STANDARD | Aperture | Inf | 0.000 | | | 1.500 |
| 2 | STANDARD | | 2.390 | 1.070 | 1.755 | 52.3228 | 2.900 |
| 3 | STANDARD | | -14.108 | 0.120 | | | 2.900 |
| 4 | STANDARD | | -3.837 | 0.305 | 1.69895 | 30.0505 | 2.900 |
| 5 | STANDARD | | 2.371 | 0.170 | | | 2.900 |
| 6 | STANDARD | | 4.544 | 1.090 | 1.755 | 52.3228 | 2.900 |
| 7 | STANDARD | | -3.068 | 1.010 | | | 2.900 |
| 8 | EVENASPH | | -2.566 | 1.590 | 1.525279 | 55.95076 | 3.260 |
| 9 | EVENASPH | | -10.795 | 0.593 | | | 4.800 |
| 10 | STANDARD | Imager | Inf | 0.000 | | | 4.921 |

FIG. 18

| Surface 8 | |
|---|---|
| | Nominal Value |
| r (mm) | -2.565701 |
| k | 0 |
| A4 | -2.09300000E-02 |
| A6 | -6.59600700E-03 |
| A8 | 8.80660000E-04 |
| A10 | 2.78659600E-03 |
| A12 | -2.91791200E-03 |
| A14 | 8.01475900E-04 |
| Surface 9 | |
| r (mm) | -10.795148 |
| k | 0 |
| A4 | 1.61070000E-02 |
| A6 | -1.64070000E-02 |
| A8 | 3.60662900E-03 |
| A10 | -2.86705600E-04 |
| A12 | -2.62229600E-05 |
| A14 | 4.73510400E-06 |

*FIG. 19*

RESOLUTION ADJUSTMENT FOR MINIATURE CAMERA

PRIORITY CLAIM

This patent application claims the benefit of the priority date of U.S. provisional patent application Ser. No. 60/657,261, filed on Feb. 28, 2005 and entitled AUTOFOCUS CAMERA and priority date of U.S. provisional patent application Ser. No. 60/697,476, filed on Jul. 7, 2005 and entitled RESOLUTION ADJUSTMENT FOR MINIATURE CAMERA pursuant to 35 USC 119. The entire contents of these provisional patent applications are hereby expressly incorporated by reference.

TECHNICAL FIELD

The present invention relates generally to optics. The present invention relates more particularly to a method and system for adjusting the resolution of a miniature camera, such as an autofocus camera suitable for use in cellular telephones and the like.

BACKGROUND

Miniature cameras are well known. Miniature cameras are widely used in contemporary cellular telephones. They are also used in other devices, such as laptop computers and personal digital assistants (PDAs). Miniature cameras can even be used as stand alone devices for such applications as security and surveillance.

Contemporary miniature cameras, such as those used in cellular telephones, are fixed focus cameras. That is, the focus of the cameras is preset. The camera has a small enough aperture so as to provide sufficient depth of field such that focus is generally acceptable over a wide range of distances. However, such stopping down severely limits the camera's use in low light conditions.

Variable focus necessitates the use of movable optics. However, movable optics suffer from inherent disadvantages. For example, the resolution provided by movable optics can be less than optimal, unless the optics are properly adjusted. Of course, adjusting the optics so as to enhance resolution likewise enhances image quality. Therefor, it is desirable to provide a method and system for adjusting the resolution of a miniature camera, such as an autofocus camera suitable for use in cellular telephones and the like.

BRIEF SUMMARY

A method and system for enhancing resolution of a camera are disclosed. The method and system facilitate the production of a miniature camera suitable for use in cellular telephones and the like, wherein the camera has enhanced resolution. According to one aspect of the present invention, the method comprises placing a single lens at a predetermined position and then adjusting the position of a lens assembly so as to enhance resolution.

More particularly, the single lens can be placed at a position of maximum focus distance, e.g., at a position for focus at infinity. The lens assembly can then be adjusted so as to provide the best focus achievable, as measured by a modulation transfer function (MTF).

The single lens can comprise an aspheric lens, such as an aspheric lens having parameters that are approximately equal to the parameters of the tables of FIGS. 8 and 9 or an aspheric lens having parameters that are approximately equal to the parameters of the tables of FIGS. 18 and 19.

The lens assembly can comprise three lenses. For example, the lens assembly can comprise a negative power lens disposed intermediate two positive power lenses. The lens assembly can comprises three lenses having parameters that are approximately equal to the parameters of the table of FIG. 8 or the parameters of the table of FIG. 18. However, as those skilled in the art will appreciate, other configurations of the lens assembly are likewise suitable. Thus, the lens assembly may comprise more or fewer than three lenses and may comprise any desired types of lenses.

The single lens can be in front of the lens assembly. That is, light can pass through the single lens before it passes through the lens assembly. Alternatively, the lens assembly can be in front of the single lens.

Once the resolution of the camera has been adjusted, the position of the lens assembly typically remains fixed. Thus, during use, only the single lens is moved so as to effect focusing. The single lens can be moved via an auto focus mechanism. Alternatively, the single lens may be stationary while the lens assembly is moved.

Thus, one or more embodiments of the present invention provide for the enhancement of resolution. Resolution enhancement is facilitated while permitting the subsequent focusing of the camera by moving only a single lens, or at least while leaving one or more lenses stationary. Focusing can alternatively be accomplished by moving more than one lens, such as by moving two, three, or more lenses. Focusing by moving only a single lens reduces the inertia associated with the moving part, thus permitting faster and more accurate focusing.

This invention will be more fully understood in conjunction with the following detailed description taken together with the following drawings.

BRIEF DESCRIPTION OF THE DRAWINGS

FIG. 4 is a flow chart showing the operation of the contemporary lens assembly of FIG. 1;

FIG. 5 is a flow chart showing the operation of the lens assembly and single lens of FIGS. 2 and 3, according to one aspect of the present invention;

FIG. 8 is a table of exemplary lens parameters associated with the lenses of FIG. 7, according to a first embodiment of the present invention;

FIG. 9 is a table of exemplary nominal values for parameters associated with the aspheric lens of FIG. 7, according to the first embodiment of the present invention;

FIG. 18 is a table of exemplary lens parameters associated with the lenses of FIG. 7, according to a second embodiment of the present invention;

FIG. 19 is a table of exemplary nominal values for parameters associated with the aspheric lens of FIG. 7, according to the second embodiment of the present invention;

Embodiments of the present invention and their advantages are best understood by referring to the detailed description that follows. It should be appreciated that like reference numerals are used to identify like elements illustrated in one or more of the figures.

DETAILED DESCRIPTION OF THE INVENTION

A method and system for enhancing the resolution of a camera are disclosed. The method and system are suitable for use in miniature cameras, such as those of personal electronic devices, including cellular telephones, personal digital assistants (PDAs), laptop computers, notebook computers, and pocket personal computers (pocket PCs).

According to one aspect of the present invention, a single lens can be place at a predetermined position and the position of a lens assembly can then be adjusted so as to enhance the resolution of the camera. The single lens can subsequently be moved so as to effect focusing of the camera while the position of the lens assembly tends to maintain enhanced resolution of the camera.

Figure 1:
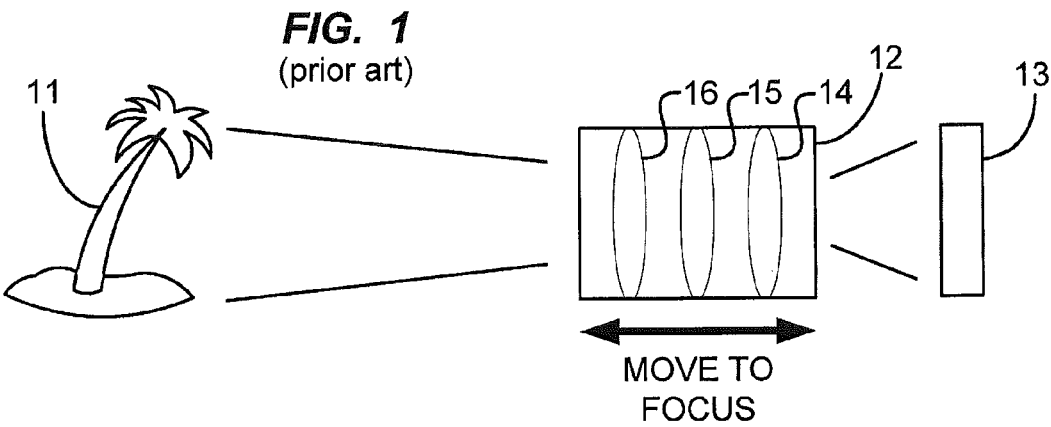
FIG. 1 is a semi-schematic illustration of a contemporary digital camera comprising a lens assembly that is moved so as to focus an image upon an imager.

Referring now to FIG. 1, a contemporary digital camera comprises a lens assembly 12 that focuses an image, such as from a scene or target 11, upon an imager 13. Lens assembly 12 typically comprises a plurality of lens elements 14, 15, and 16, for example, that cooperate to mitigate aberrations so as to form a well focused image.

Referring now to FIG. 4, according to contemporary practice such a camera is focused by moving the lens assembly 12, as indicated in block 31. No attempt is made to optimize the resolution of the camera, other than the attempt to precisely position lens assembly 12 for optimal focus. The position of lens assembly 12 depends upon the distance to target 11.

However, it is desirable to optimize the resolution of a camera, so as to enhance the quality of images formed therewith. Further, in miniature cameras such as those used in cell phones, it is desirable to minimize the mass of moving components. Moving heavier components requires more energy, more time, and the use of larger actuators. Thus, in miniature cameras it is desirable to reduce the mass of any lenses that must be moved in order to focus the camera.

The use of a single moving lens also enhances shock and vibration resistance. The reduced mass of a single lens, as compared to a multi-lens assembly, makes the single lens more resistant to the forces caused by shock and vibration. A moving lens is inherently somewhat more difficult to make shock and vibration resistant, since it is not secured in place the way that a stationary lens can be. Thus, the use of a single lens as the moving element can be of substantial advantage.

The use of a single lens as the moving optical element can reduce the size of a camera, since it is then not necessary to move a larger, multi-lens assembly. The moving components are smaller, the actuator can be smaller, and the power source (battery) can be smaller. This reduction in size can be very important for such application as use in cellular telephones.

Figure 3:
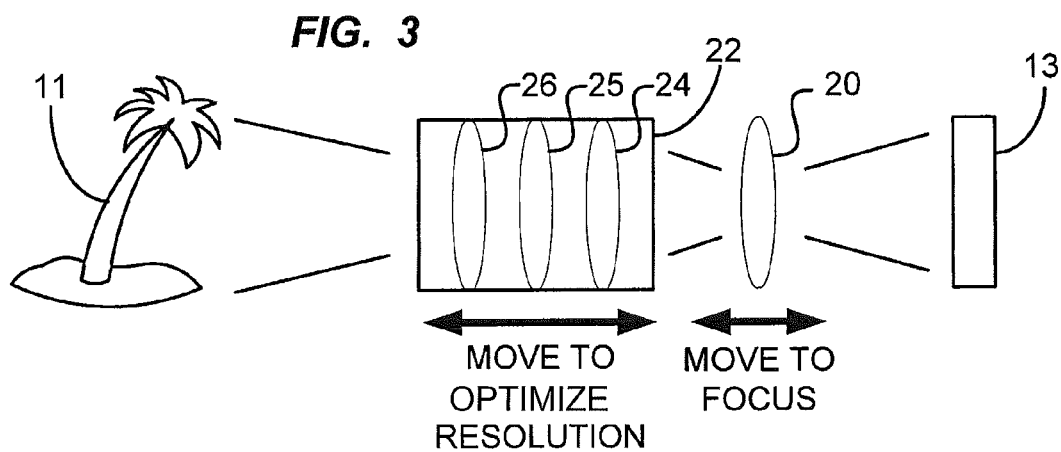
FIG. 3 is a semi-schematic illustration of a digital camera comprising a single lens that is moved so as to focus an image upon an imager and also comprising a lens assembly that is adjusted (for example, moved during assembly) so as to enhance resolution of the digital camera, wherein the positions of the single lens and the lens assembly are swapped with respect to the configuration of FIG. 2, according to another exemplary configuration of the present invention.

By placing a stationary (at least it is stationary after an initial resolution adjustment) lens assembly in front of the moving single lens as shown in FIG. 3, enhanced light and dust sealing can be provided. That is, by making the moving element completely internal to the camera, the fixed lens assembly can be sealed to the camera housing or some other structure, since the lens assembly does not move with respect thereto. The need for structures that move or slide with respect to one another, as is the case with contemporary focusing lenses, is eliminated. Consequently, the path for dust and light to undesirably enter the camera through the space between the moving surfaces is likewise eliminated.

A method and system for adjusting the resolution of a compact auto focus camera is disclosed below. According to one aspect of the present invention, the mass of the moving element is substantially reduced.

Figure 2:
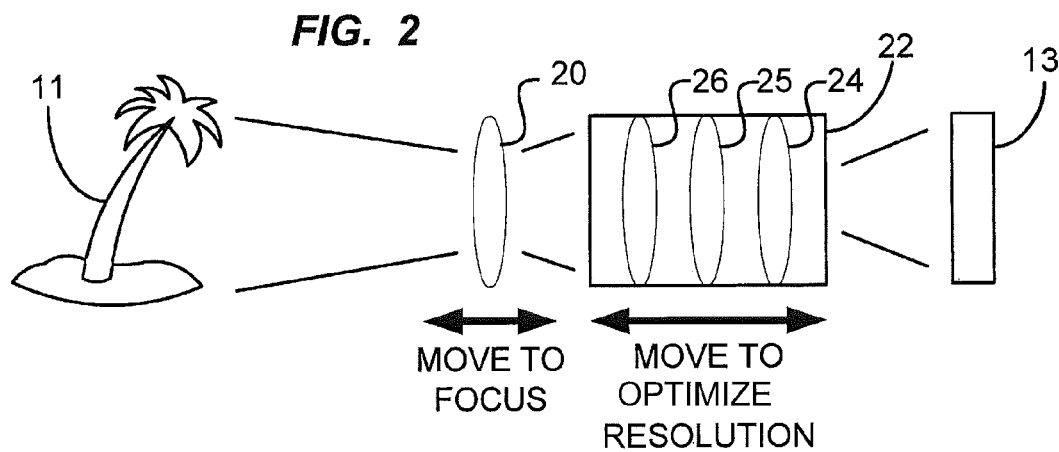
FIG. 2 is a semi-schematic illustration of a digital camera comprising a single lens that is moved so as to focus an image upon an imager and also comprising a lens assembly that is adjusted (for example, moved during assembly) so as to enhance resolution of the digital camera, according to an exemplary configuration of the present invention.

Referring now to FIG. 2, according to the present invention, a lens assembly 22 comprises a plurality of lens elements

24, 25, 26. Optionally, lens assembly 22 is only moved during a setup or calibration process. Focusing lens 20 is moved during operation to focus the camera.

Referring now to FIG. 3, the positions of focusing lens 20 and lens assembly 22 can be reversed with respect to the configuration shown in FIG. 2. Further, instead of moving lens 20 to focus and moving lens assembly 22 to optimize resolution, the opposite can be done. This is true for both the configuration shown in FIG. 2 and the configuration shown in FIG. 3). That is, lens 20 can be moved to optimize resolution and lens assembly 22 can be moved to focus. However, generally it is advantageous to move lens 20 to focus, since lens 20 is generally lighter than lens assembly 22.

Although FIGS. 2 and 3 show single lens 20 being moved to focus the camera and lens assembly 22 being moved to optimize resolution, it is worthwhile to appreciate that alternatively single lens 20 can be moved to optimize resolution and lens assembly 22 can be moved to focus the camera. Indeed, both single lens 20 and lens assembly 22 can be moved together to focus the camera and/or to optimize resolution.

Referring now to FIG. 5, calibration of the configuration shown in FIG. 2 is discussed. Calibration of the configuration shown in FIG. 3 is analogous. During calibration of the camera, single lens 20 is moved to a predetermined position, such as for focus at the maximum focus distance, e.g., infinity, as indicated in block 41. Then, lens assembly 22 is moved so as to provide the sharpest image that can be obtained, thus tending to maximize resolution. This may be accomplished by using the Modulation Transfer Function (MTF) as a measure of resolution, as indicated in block 42. The process of moving single lens 20 and then moving lens assembly 22 for the sharpest image can be iterated until the desired MTF criteria is met. During each iteration, either the same or a different position of single lens 20 can be used.

Once a position of lens assembly 22 has been found that provides acceptable resolution, then the position of lens assembly 22 is fixed such that it does not change during subsequent use of the camera. A set screw, adhesive, or any other desired method may be used to effect such fixing of lens assembly 22. Thus, movement of lens assembly 22 is generally only performed during manufacture/calibration and/or during repair/re-calibration.

In addition to enhancing the resolution of a camera, the present invention also provides a miniature camera configuration that can advantageously be used in cell phones and similar applications, where the size of the camera must be minimized. According to the present invention, the mass of the component that must be moved in order to effect focusing is substantially reduced. Consequently, the size of the actuator required to effect focusing and the amount of energy required therefore are likewise reduced (thus reducing battery size, as well).

Figure 6:
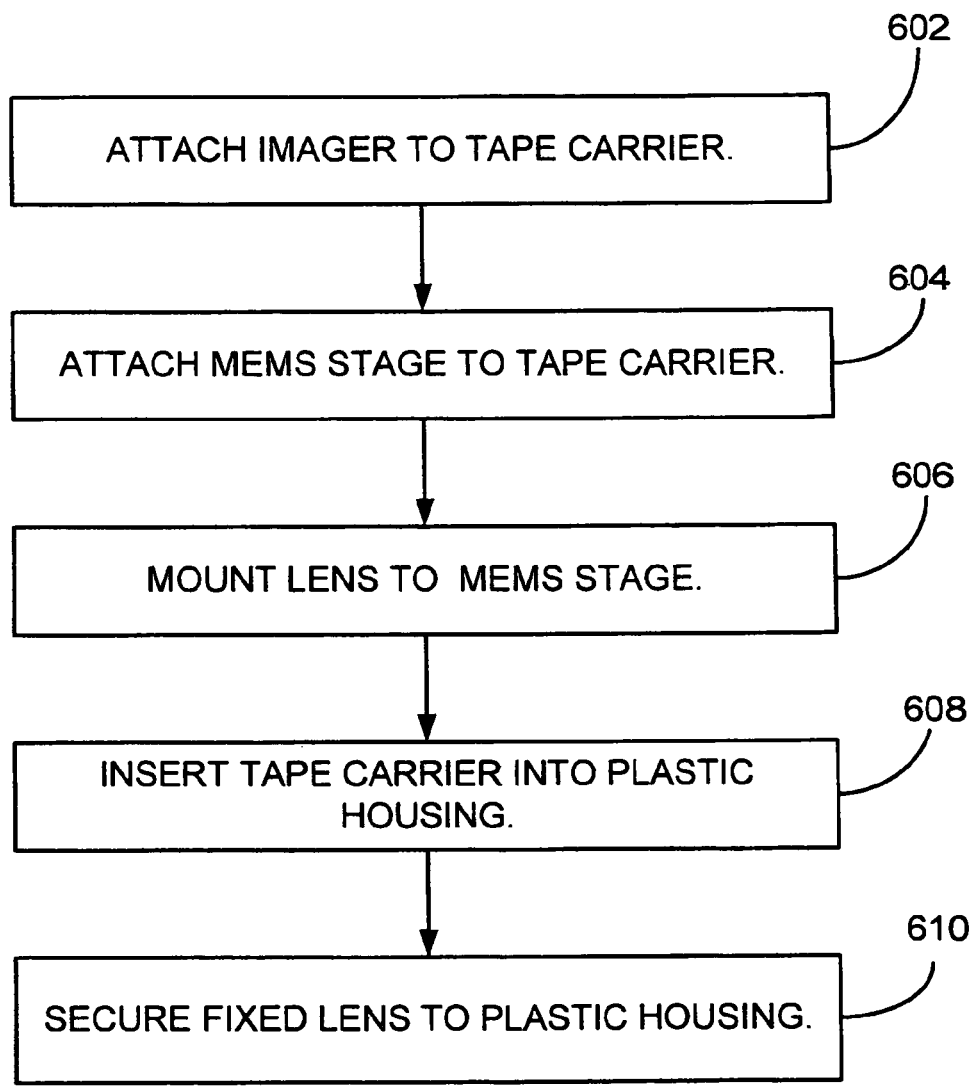
FIG. 6 is a flow chart showing assembly of the imager, stage and optics, according to one aspect of the present invention.

FIG. 6 shows a flowchart of a method for manufacturing a compact auto-focus lens assembly according to one embodiment. In step 602, an imager is attached to a tape carrier, such as using a wafer level packaged (WLP) imager, which is solder bumped to a flex circuit, e.g., using surface mount technology (SMT). Other methods for attaching an imager may also be suitable.

Next, a MEMS stage is attached to the tape carrier, in step 604. The MEMS stage allows a subsequently mounted moveable lens to move linearly closer to or farther away from the imager along the optical axis. The MEMS stage can include one or more electrostatic MEMS actuators that respond to electrical signals and, in response to such signals, move the attached lens or other component a corresponding amount. The MEMS stage can also include features, such as one or more protrusions or recesses, that allow the lens or other optical component to be fitted or attached onto the stage.

One or more lenses are then passively mounted to the MEMS stage and aligned in step 606. In one embodiment, the lenses have a complementary feature to the feature of the MEMS stage. For example, the bottom portion of the lens may have a square or rectangular protrusion, while the MEMS stage may have a corresponding or matching square or rectangular recess. The matching recess in the MEMS stage may have a tapered or graduated portion at the upper part of the recess. In one embodiment, a 45° taper is provided, which allows the lens to be more easily fitted into the recess. The lens may be secured or tagged to the MEMS stage, such as by a UV curable epoxy. Some suitable techniques for passive alignment are disclosed in commonly-owned U.S. Pat. No. 6,661,955, entitled "Kinematic and Non-Kinematic Passive Alignment Assemblies and Methods of Making the Same", which is incorporated by reference herein in its entirety.

Next, in step 608, the tape carrier, along with the MEMS stage, lens, and imager, is attached to a rigid board (such as by ACF or TAG outer lead bonding techniques) and inserted into a plastic carrier or housing. The carrier or housing can be injection molded with the desired features and shape. In one embodiment, the carrier has a recessed portion for the MEMS stage, the imager, and a fixed lens assembly, such as lens assembly 22 of FIG. 2. Thus, the tape carrier and its associated components can be placed or pushed into corresponding portions on the carrier and secured, such as by tagging with UV curable epoxy. The fixed lens assembly is then pushed into the carrier and secured in step 610.

Figure 7:
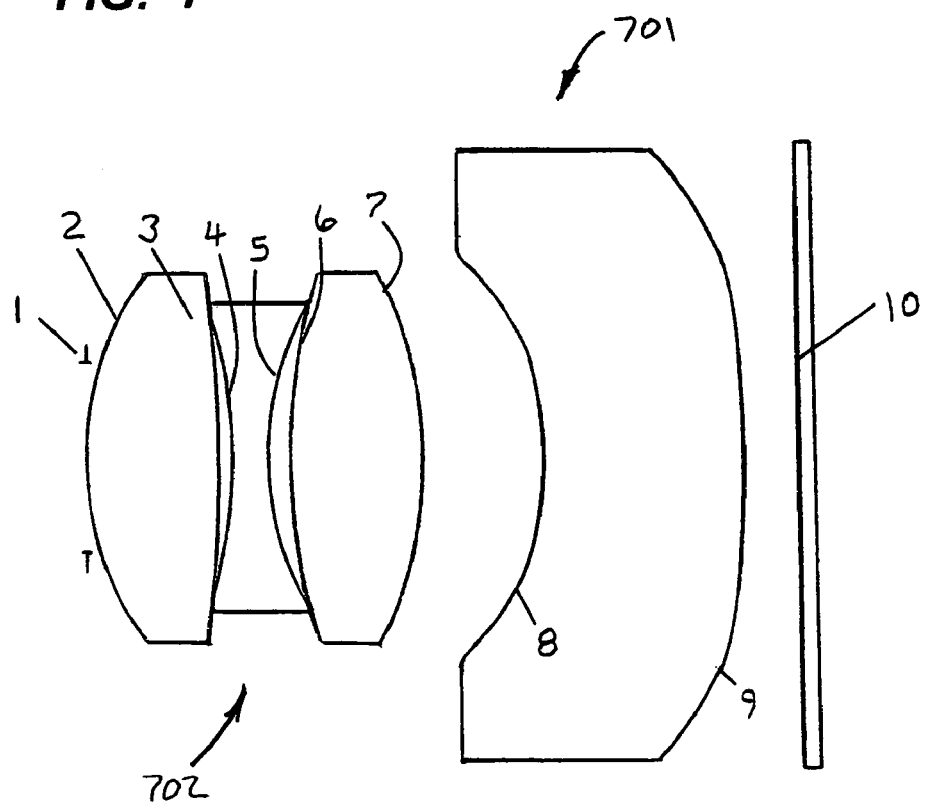
FIG. 7 is a semi-schematic side view showing an exemplary single lens and lens assembly, according to one embodiment of the present invention.

FIG. 7 is a semi-schematic side view showing an exemplary single lens and lens assembly, according to one embodiment of the present invention. Single lens 701 can comprise an aspheric lens having parameters for the surfaces thereof as listed in the tables of FIGS. 8 and 9 or alternatively having parameters for the surfaces thereof as listed in the tables of FIGS. 18 and 19. The numbers (1-10) of the surfaces shown in FIG. 7 correspond to the number of the surfaces listed in the tables of FIGS. 8, 9, 18, and 19.

The parameters of the tables of FIGS. 8 and 9 are for a first embodiment of the present invention that utilizes a larger imager, having an image diameter of 6 millimeters. Similarly, the parameters of the tables of FIGS. 18 and 19 are for a second embodiment of the present invention that utilizes a smaller imager, having a diameter of 4.9 millimeters.

In the table of FIG. 8, D7 can be from approximately 1.2 to approximately 1.53 millimeters and D9 can be from approximately 0.498 to approximately 0.168 millimeters for an object at a distance between 10 centimeters and infinity with respect to the first surface of lens assembly 702.

The field of view is 57.5 degrees. The F number is between 2.8 and 3.0 for an object at a distance between 10 centimeters and infinity with respect to the first surface of lens assembly 702.

The configuration shown in FIG. 7 and the parameters listed in the tables of FIGS. 8, 9, 18, and 19 are exemplary only. Those skilled in the art will appreciate that various other configurations and/or parameters are likely suitable. For example, imagers that are substantially larger than 6 millimeters or that are substantially smaller than 4.9 millimeters may require lenses having substantially different parameters than those listed in the tables of FIGS. 8, 9, 18, and 19. Thus, the configuration shown in FIG. 7 and the parameters listed in the tables of FIGS. 8, 9, 18, and 19 are by way of example only, and not by way of limitation.

FIG. 8 is a table of exemplary lens parameters associated with the lenses of FIG. 7 according to a first embodiment of the present invention.

FIG. 9 is a table of exemplary nominal values for parameters associated with the aspheric lens of FIG. 8, according to the first embodiment of the present invention. As those skilled in the art will appreciate, an even aspheric surface is defined as:

$$Z = (y^2/r)/[1 + \{1 - (K+1)(y/r)^2\}^{1/2}] + A_4 y^4 + A_6 y^6 + A_8 y^8 + A_{10} y^{10} + A_{12} y^{12} + A_{14} y^{14}$$

where z represents the coordinate in the direction of the optical axis, r is the curvature radius of the surface, y represents the radial distance from the optical axis, K represents a conic coefficient, and A4, A6, A8, A10, A12, and A14 represent spherical coefficients. The two even aspheric surfaces are defined in the tables of FIGS. 9 and 19.

This formula applies to the tables of both FIG. 9 and FIG. 19.

Figure 10:
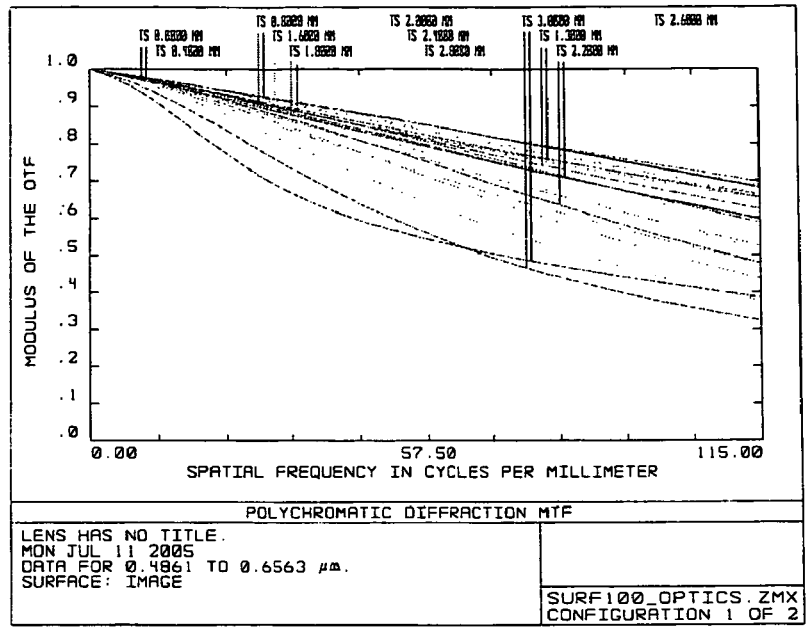
FIG. 10 is a chart showing the polychromatic diffraction modulation transfer function (MTF) of the first embodiment of the present invention, for an object at infinity.

FIG. 10 is a chart showing the polychromatic diffraction modulation transfer function (MTF) of the first embodiment of the present invention, for an object at infinity. The MTF at spatial frequency of 115 cycles per millimeter is from approximately 0.3 to approximately 0.7.

Figure 11:
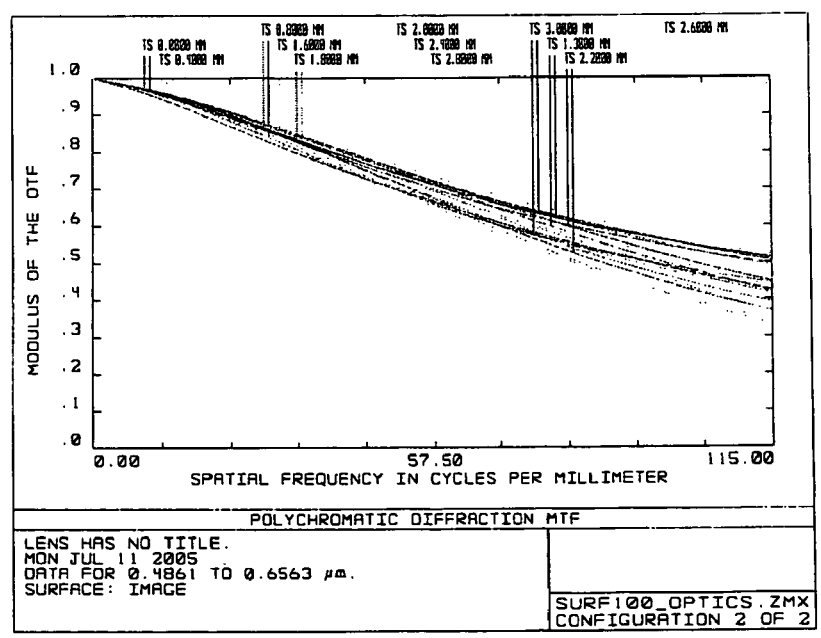
FIG. 11 is a chart showing the polychromatic diffraction modulation transfer function (MTF) of the first embodiment of the present invention for an object at 10 centimeters.

FIG. 11 is a chart showing the polychromatic diffraction modulation transfer function (MTF) of the first embodiment of the present invention, for an object at 10 centimeters. The MTF at spatial frequency of 115 cycles per millimeter is from approximately 0.3 to approximately 0.5.

Figure 12:
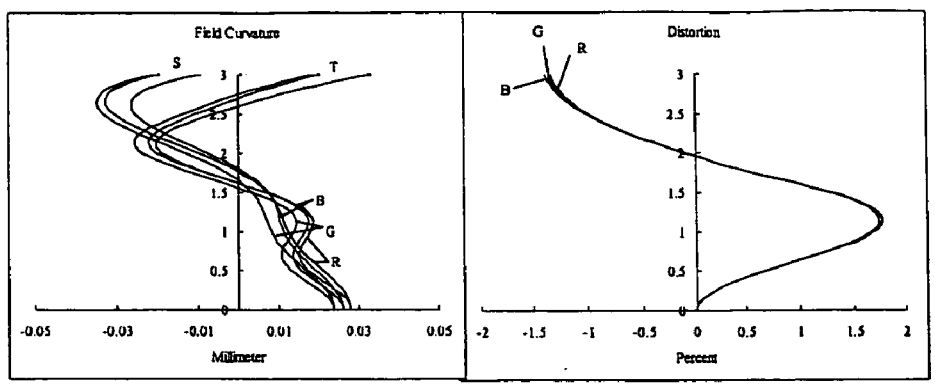
FIG. 12 is a chart showing the field curvature/distortion of the first embodiment of the present invention for an object at infinity.

FIG. 12 is a chart showing the field curvature/distortion of the first embodiment of the present invention, for an object at infinity. The maximum distortion is within +/−2%.

Figure 13:
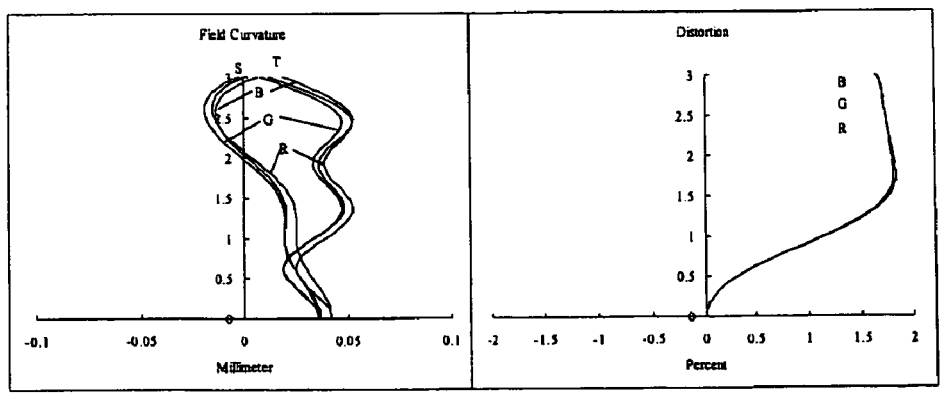
FIG. 13 is a chart showing the field curvature/distortion of the first embodiment of the present invention for an object at 10 centimeters.

FIG. 13 is a chart showing the field curvature/distortion of the first embodiment of the present invention, for an object at 10 centimeters. The maximum distortion is within +/−2%.

Figure 14:
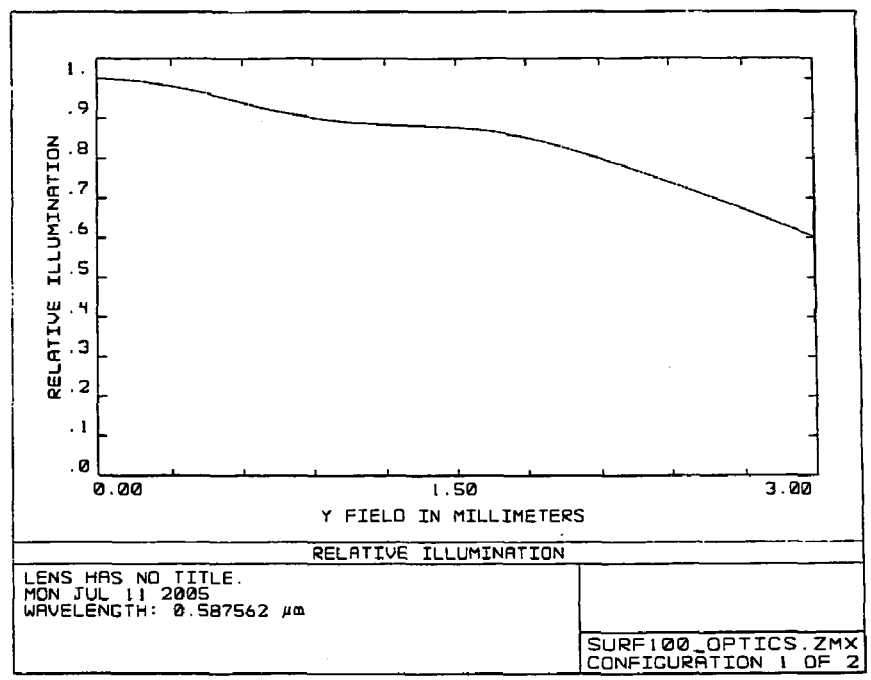
FIG. 14 is a chart showing the relative illumination of the first embodiment of the present invention for an object at infinity.

FIG. 14 is a chart showing the relative illumination of the first embodiment of the present invention, for an object at infinity. The minimum relative illumination is above 60%.

Figure 15:
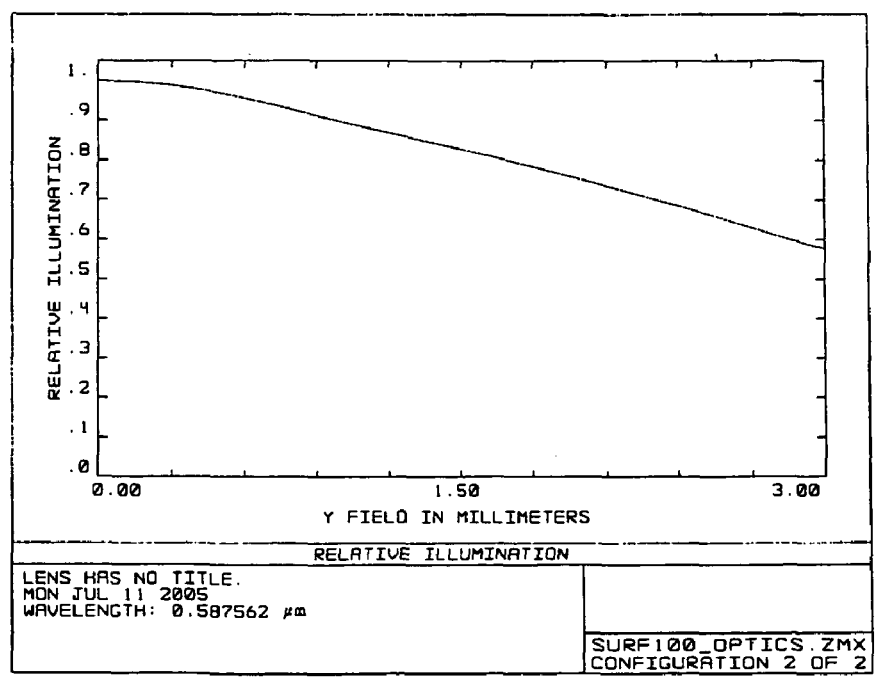
FIG. 15 is a chart showing the relative illumination of the first embodiment of the present invention for an object at 10 centimeters.

FIG. 15 is a chart showing the relative illumination of the first embodiment of the present invention, for an object at 10 centimeters. The minimum relative illumination is above 50%.

Figure 16:
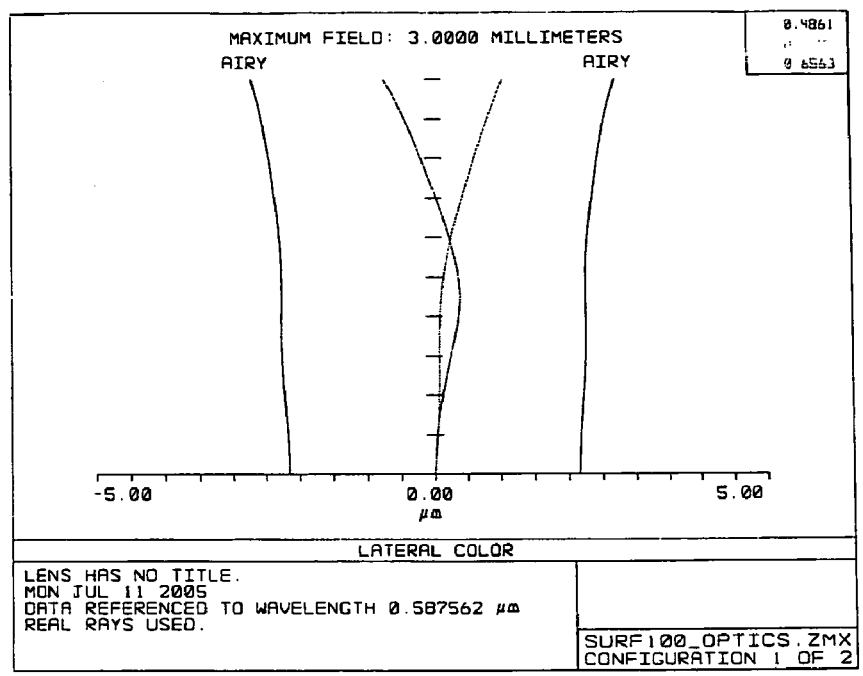
FIG. 16 is a chart showing lateral color shift for the first embodiment of the present invention for an object at infinity.

FIG. 16 is a chart showing lateral color shift for the first embodiment of the present invention, for an object at infinity. The lateral color shift with visible light is less than the Airy diffraction limit.

Figure 17:
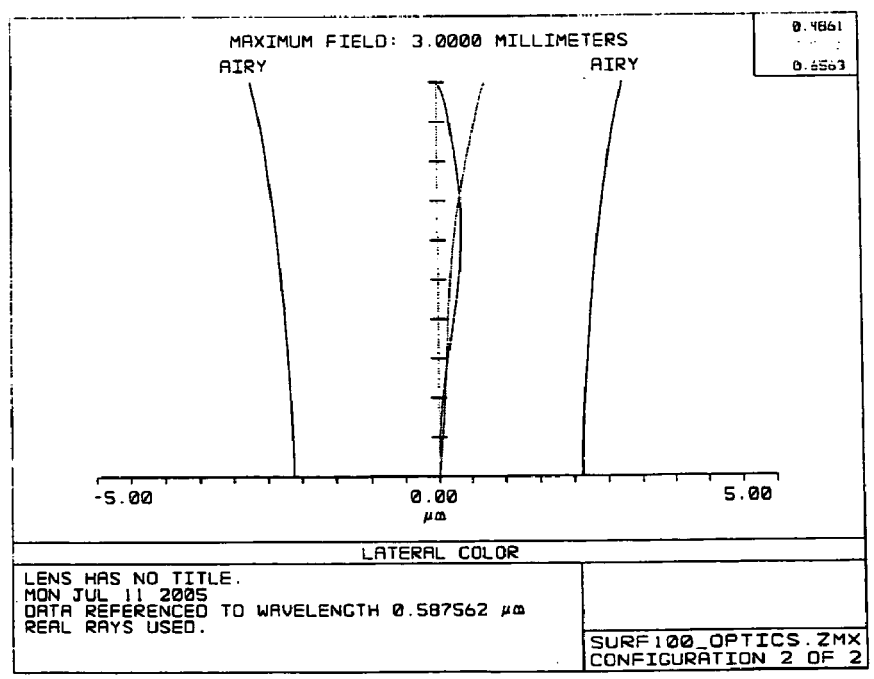
FIG. 17 is a chart showing lateral color shift for the first embodiment of the present invention for an object at 10 centimeters.

FIG. 17 is a chart showing lateral color shift for the first embodiment of the present invention, for an object at 10 centimeters. The lateral color shift with visible light is less than the Airy diffraction limit.

FIG. 18 is a table of exemplary lens parameters associated with the lenses of FIG. 7, according to a second embodiment of the present invention.

In the table of FIG. 18, D7 can be from approximately 1.01 to approximately 1.31 millimeter and D9 can be from approximately 0.593 to approximately 0.293 millimeter for an object at a distance between 10 centimeters and infinity with respect to the first surface of lens assembly 702.

The field of view is 57.6 degrees. The F number is between 2.9 and 3.0 for an object at a distance between 10 centimeters and infinity with respect to the first surface of lens assembly 702.

FIG. 19 is a table of exemplary nominal values for parameters associated with the aspheric lens of FIG. 8, according to the second embodiment of the present invention.

Figure 20:
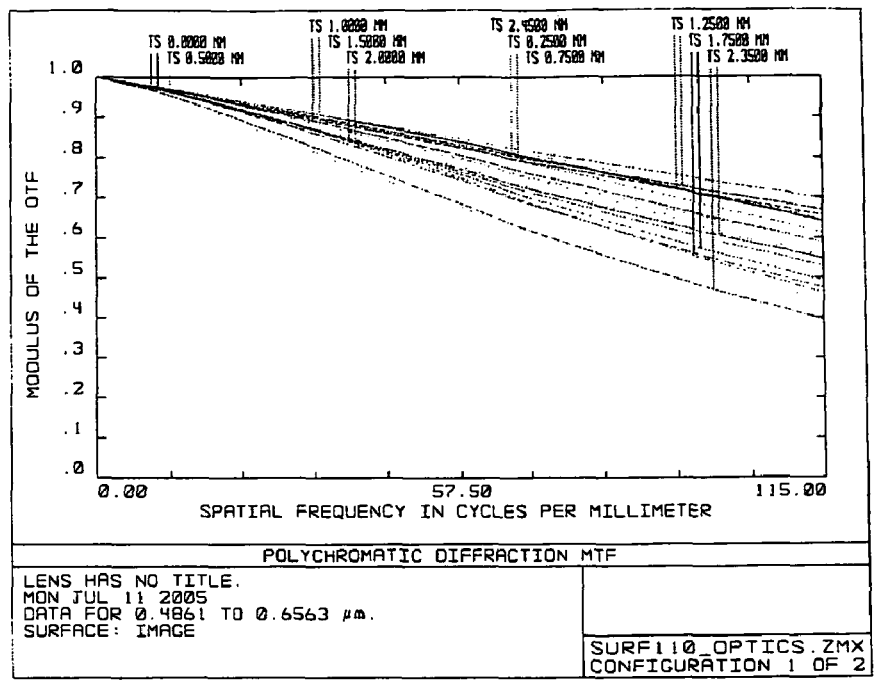
FIG. 20 is a chart showing the polychromatic diffraction modulation transfer function (MTF) of the second embodiment of the present invention, for an object at infinity.

FIG. 20 is a chart showing the polychromatic diffraction modulation transfer function (MTF) of the second embodiment of the present invention, for an object at infinity. The MTF at spatial frequency of 115 cycles per millimeter is from approximately 0.3 to approximately 0.7.

Figure 21:
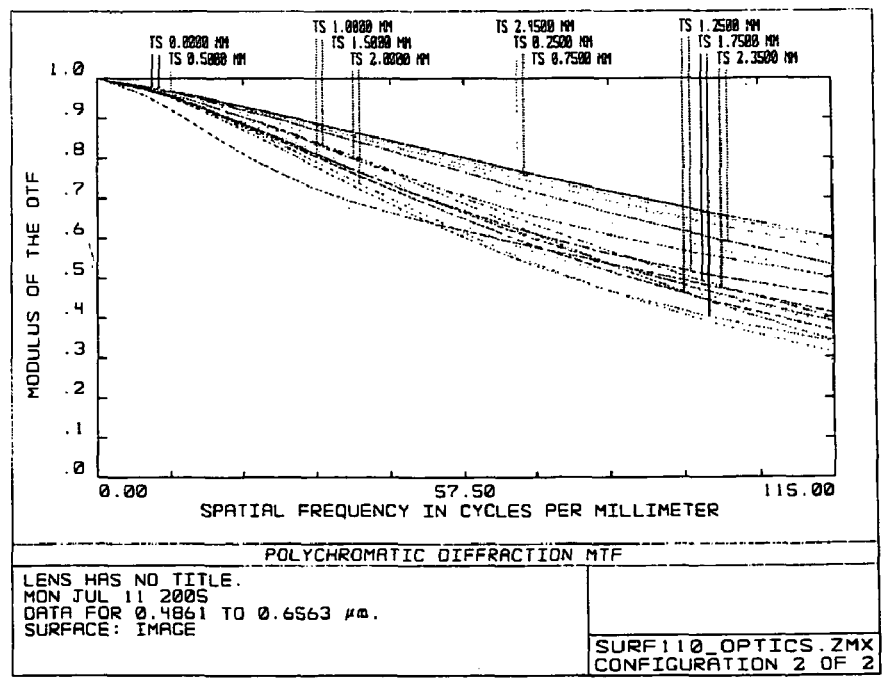
FIG. 21 is a chart showing the polychromatic diffraction modulation transfer function (MTF) of the second embodiment of the present invention for an object at 10 centimeters.

FIG. 21 is a chart showing the polychromatic diffraction modulation transfer function (MTF) of the second embodiment of the present invention, for an object at 10 centimeters. The MTF at spatial frequency of 115 cycles per millimeter is from approximately 0.3 to approximately 0.6.

Figure 22:
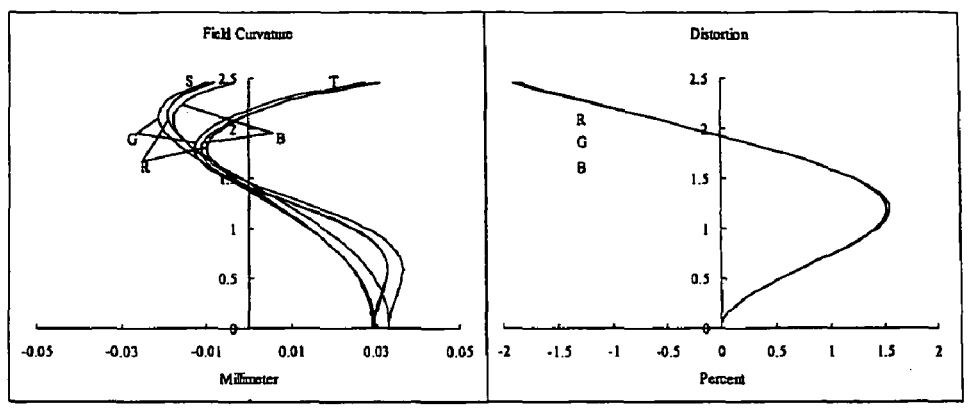
FIG. 22 is a chart showing the field curvature/distortion of the second embodiment of the present invention for an object at infinity.

FIG. 22 is a chart showing the field curvature/distortion of the second embodiment of the present invention, for an object at infinity. The maximum distortion is generally within +/−2%.

Figure 23:
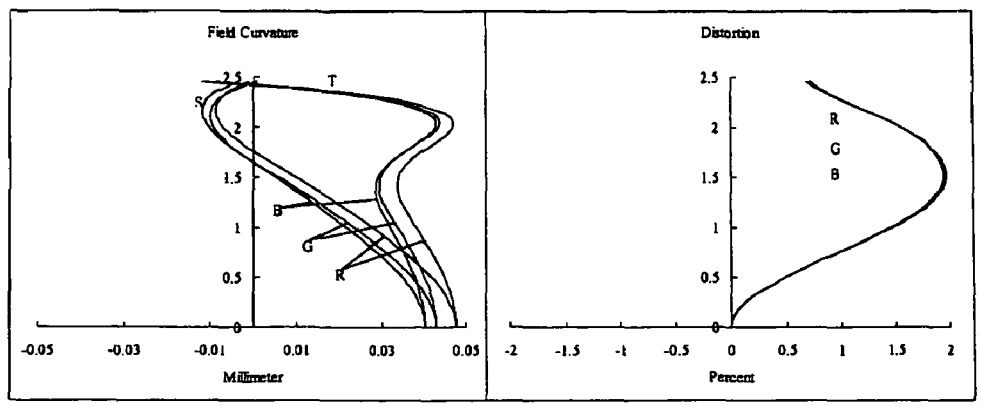
FIG. 23 is a chart showing the field curvature/distortion of the second embodiment of the present invention for an object at 10 centimeters.

FIG. 23 is a chart showing the field curvature/distortion of the second embodiment of the present invention, for an object at 10 centimeters. The maximum distortion is generally within +/−2%.

Figure 24:
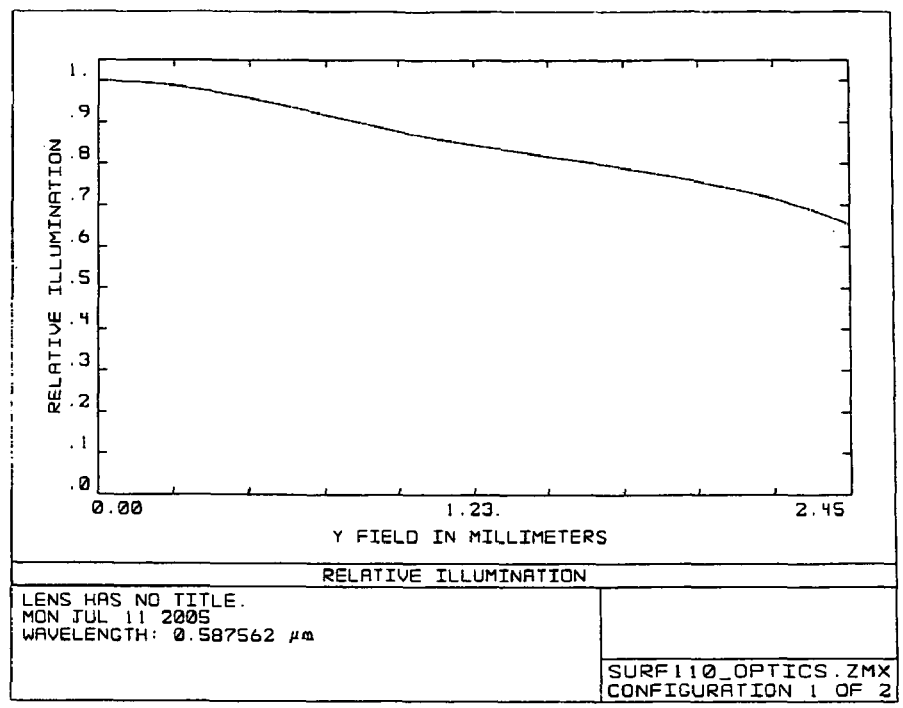
FIG. 24 is a chart showing the relative illumination of the second embodiment of the present invention for an object at infinity.

FIG. 24 is a chart showing the relative illumination of the second embodiment of the present invention, for an object at infinity. The minimum relative illumination is above 60%.

Figure 25:
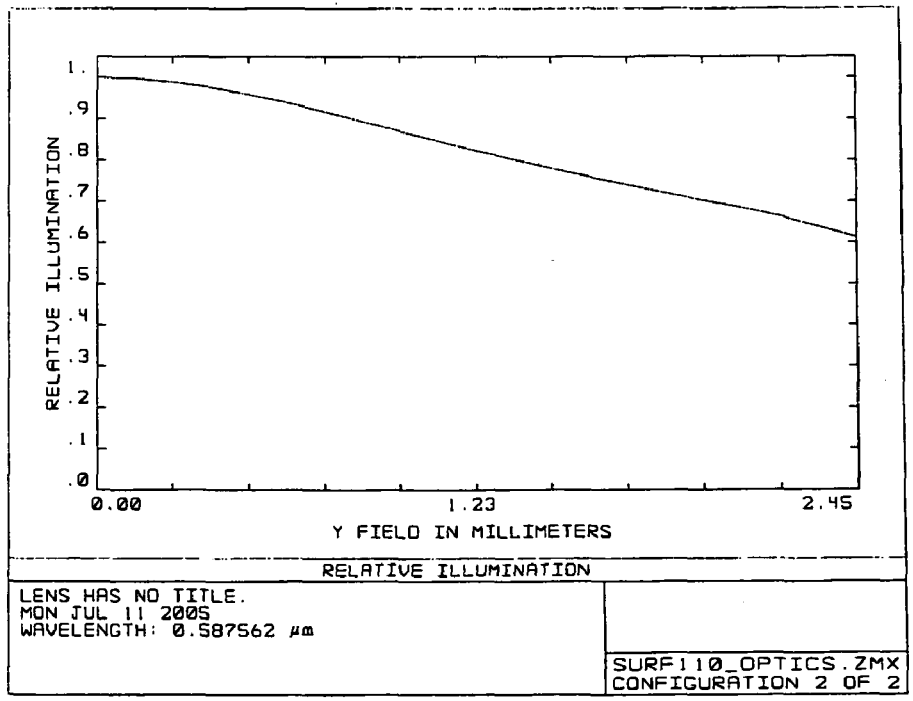
FIG. 25 is a chart showing the relative illumination of the second embodiment of the present invention for an object at 10 centimeters.

FIG. 25 is a chart showing the relative illumination of the second embodiment of the present invention, for an object at 10 centimeters. The minimum relative illumination is above 60%.

Figure 26:
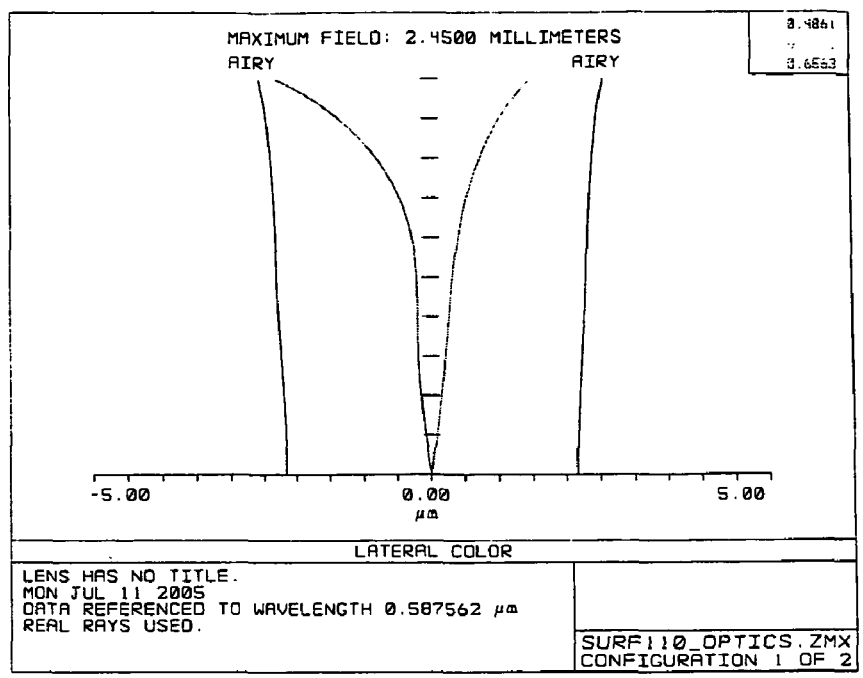
FIG. 26 is a chart showing lateral color shift for the second embodiment of the present invention for an object at infinity.

FIG. 26 is a chart showing lateral color shift for the second embodiment of the present invention, for an object at infinity. The lateral color shift with visible light is less than the Airy diffraction limit.

Figure 27:
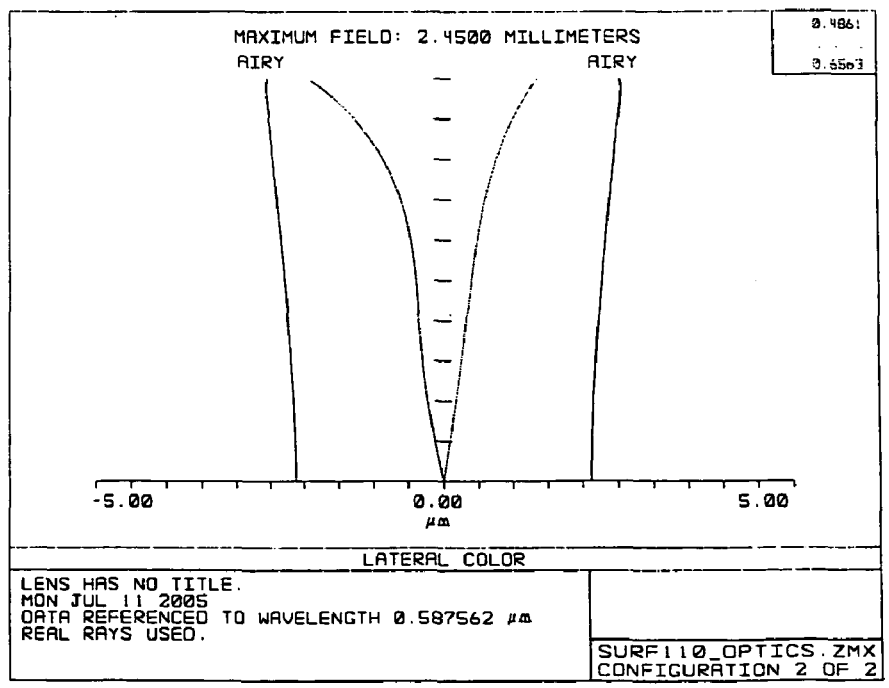
FIG. 27 is a chart showing lateral color shift for the second embodiment of the present invention for an object at 10 centimeters.

FIG. 27 is a chart showing lateral color shift for the second embodiment of the present invention, for an object at 10 centimeters. The lateral color shift with visible light is less than the Airy diffraction limit.

Thus, one or more embodiments of the present invention provide for the enhancement of resolution. Resolution enhancement is facilitated while permitting the subsequent focusing of the camera by moving only a single lens. Focusing by moving only a single lens reduces the inertia associated with the moving part, thus permitting faster and more accurate focusing.

Faster focusing is provided because the inertia of the single lens is reduced and there the single lens can be moved with less power and in a shorter amount of time. It is simply easier to move lighter items. More accurate focusing is provided since the reduced inertia of the single lens makes it less likely for the lens to overshoot its intended position, thus making position readjustments or corrections less likely.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A method for enhancing resolution of a camera, the method comprising:
    placing one of a movable single lens and a movable lens assembly at a predetermined position, the other of the single lens and the lens assembly being movable so as to optimize resolution;
    adjusting a position of the other of the single lens and the lens assembly so as to enhance resolution; and
    wherein the single lens and the lens assembly are independently movable with respect to one another.

2. The method as recited in claim 1, wherein the single lens is placed at the predetermined position and the position of the lens assembly is adjusted.

3. The method as recited in claim 2, wherein the predetermined position of the single lens is a position of maximum focus distance.

4. The method as recited in claim 2, wherein the predetermined position of the single lens is a position for focus at infinity.

5. The method as recited in claim 1, wherein the single lens comprises an aspheric lens.

6. The method as recited in claim 1, wherein the single lens comprises an aspheric lens having parameters that are approximate to the following:
   index of refraction: 1.525279;
   V-Number: 55.95076;
   radius of curvature of first surface: −2.504 mm;
   diameter of first surface: 3.500 mm;
   k value of first surface: 0;
   A4 value of first surface: 3.52151500E-03;
   A6 value of first surface: −4.62830000E-02;
   A8 value of first surface: 4.96300000E-02;
   A10 value of first surface: −2.89420000E-02;
   A12 value of first surface: 8.34182000E-03;
   A14 value of first surface: −9.42837700E-04;
   radius of curvature of second surface: 9.888 mm;
   diameter of second surface: 6.000 mm;
   k value of second surface: 0;
   A4 value of second surface: 4.19450000E-02;
   A6 value of second surface: −3.09500000E-02;
   A8 value of second surface: 8.35002200E-03;
   A10 value of second surface: −1.21351200E-03;
   A12 value of second surface: 9.26702600E-05; and
   A14 value of second surface: −2.91798000E-06.

7. The method as recited in claim 1, wherein the single lens comprises an aspheric lens having parameters that are approximate to the following:
   index of refraction: 1.525279;
   V-Number: 55.95076;
   radius of curvature of first surface: −2.566 mm;
   diameter of first surface: 3.260 mm;
   k value of first surface: 0;
   A4 value of first surface: −2.09300000E-02;
   A6 value of first surface: −6.59600700E-03;
   A8 value of first surface: 8.80660000E-04;
   A10 value of first surface: 2.78659600E-03;
   A12 value of first surface: −2.91791200E-03;
   A14 value of first surface: 8.01475900E-04;
   radius of curvature of second surface: −10.795148 mm;
   diameter of second surface: 4.800 mm;
   k value of second surface: 0;
   A4 value of second surface: 1.61070000E-02;
   A6 value of second surface: −1.64070000E-02;
   A8 value of second surface: 3.60662900E-03;
   A10 value of second surface: −2.86705600E-04;
   A12 value of second surface: −2.62229600E-05; and
   A14 value of second surface: 4.73510400E-06.

8. The method as recited in claim 1, wherein the lens assembly comprises three lenses.

9. The method as recited in claim 1, wherein the lens assembly comprises a negative power lens disposed intermediate two positive power lenses.

10. The method as recited in claim 1, wherein the lens assembly comprises a first lens, a second lens, and a third lens having parameters that are approximate to the following:
    first lens:
       index of refraction: 1.755;
       V-Number: 52.3228;
       radius of curvature of first surface: 2.664 mm;
       diameter of first surface: 3.000 mm;
       radius of curvature of second surface: −14.091 mm;
       diameter of second surface: 3.000 mm;
    second lens:
       index of refraction: 1.69895;
       V-Number: 30.0505;
       radius of curvature of first surface: −3.895 mm;
       diameter of first surface: 3.000 mm;
       radius of curvature of second surface: 2.830 mm;
       diameter of second surface: 3.000 mm;
    third lens;
       index of refraction: 1.755;
       V-Number: 52.3228;
       radius of curvature of first surface: 6.128 mm;
       diameter of first surface: 3.000 mm;
       radius of curvature of second surface: −3.319 mm; and
       diameter of second surface: 3.000 mm.

11. The method as recited in claim 1, wherein the lens assembly comprises a first lens, a second lens, and a third lens having parameters that are approximate to the following:
    first lens:
       index of refraction: 1.755;
       V-Number: 52.3228;
       radius of curvature of first surface: 2.390 mm;
       diameter of first surface: 2.900 mm;
       radius of curvature of second surface: −14.108 mm;
       diameter of second surface: 2.900 mm;
    second lens:
       index of refraction: 1.69895;
       V-Number: 30.0505;
       radius of curvature of first surface: −3.837 mm;
       diameter of first surface: 2.900 mm;
       radius of curvature of second surface: 2.371 mm;
       diameter of second surface: 2.900 mm;
    third lens;
       index of refraction: 1.755;
       V-Number: 52.3228;
       radius of curvature of first surface: 4.544 mm;
       diameter of first surface: 2.900 mm;
       radius of curvature of second surface: −3.068 mm; and
       diameter of second surface: 2.900 mm.

12. The method as recited in claim 1, wherein light passes through the single lens before passing through the lens assembly.

13. The method as recited in claim 1, wherein light passes through the lens assembly before passing through the single lens.

14. The method as recited in claim 2, wherein adjusting a position of a lens assembly so as to enhance resolution comprises adjusting the position of the lens assembly so as to provide enhanced resolution using a modulation transfer function.

15. A method for focusing a miniature camera, the method comprising:
    maintaining one of a movable single lens and a movable lens assembly at a fixed position that enhances a resolution of the miniature camera;
    moving the other of the single lens and the lens assembly so as to focus the miniature camera; and
    wherein the single lens and the lens assembly are independently movable with respect to one another.

16. The method as recited in claim 15, wherein the lens assembly is maintained at the fixed position and the single lens is moved so as to enhance resolution.

17. The method as recited in claim 15, wherein moving the single lens comprises moving the single lens via an auto focus mechanism.

18. A compact auto focus system for a miniature camera comprising:
first movable means for refracting light, the first means being moved and then fixed in a position that enhances a resolution of the camera;
second movable means for refracting light, the second means being movable so as to effect focusing of the camera; and
wherein the first movable means and the second moveable are independently movable with respect to one another.

19. An optical system for a miniature camera comprising:
a movable lens assembly comprising a plurality of lens elements;
a movable single movable lens;
wherein one of the lens assembly and the single lens is moved and then fixed in a position that enhances a resolution of the camera and the other of the lens assembly and the single lens moves so as to effect focusing of the camera; and
wherein the single lens and the lens assembly are independently movable with respect to one another.

20. The optical system as recited in claim 19, wherein the lens assembly is fixed in a position that enhances resolution of the camera and the single lens moves so as to effect focusing of the camera.

21. The optical system as recited in claim 19, wherein the single lens comprises an aspheric lens.

22. The optical system as recited in claim 19, wherein the single lens comprises an aspheric lens having parameters that are approximate to the following:
index of refraction: 1.525279;
V-Number: 55.95076;
radius of curvature of first surface: −2.504 mm;
diameter of first surface: 3.500 mm;
k value of first surface: 0;
A4 value of first surface: 3.52151500E-03;
A6 value of first surface: −4.62830000E-02;
A8 value of first surface: 4.96300000E-02;
A10 value of first surface: −2.89420000E-02;
A12 value of first surface: 8.34182000E-03;
A14 value of first surface: −9.42837700E-04;
radius of curvature of second surface: 9.888 mm;
diameter of second surface: 6.000 mm;
k value of second surface: 0;
A4 value of second surface: 4.19450000E-02;
A6 value of second surface: −3.09500000E-02;
A8 value of second surface: 8.35002200E-03;
A10 value of second surface: −1.21351200E-03;
A12 value of second surface: 9.26702600E-05; and
A14 value of second surface: −2.91798000E-06.

23. The optical system as recited in claim 19, wherein the single lens comprises an aspheric lens having parameters that are approximate to the following:
index of refraction: 1.525279;
V-Number: 55.95076;
radius of curvature of first surface: −2.566 mm;
diameter of first surface: 3.260 mm;
k value of first surface: 0;
A4 value of first surface: −2.09300000E-02;
A6 value of first surface: −6.59600700E-03;
A8 value of first surface: 8.80660000E-04;
A10 value of first surface: 2.78659600E-03;
A12 value of first surface: −2.91791200E-03;
A14 value of first surface: 8.01475900E-04;
radius of curvature of second surface: −10.795148 mm;
diameter of second surface: 4.800 mm;
k value of second surface: 0;
A4 value of second surface: 1.61070000E-02;
A6 value of second surface: −1.64070000E-02;
A8 value of second surface: 3.60662900E-03;
A10 value of second surface: −2.86705600E-04;
A12 value of second surface: −2.62229600E-05; and
A14 value of second surface: 4.73510400E-06.

24. The optical system as recited in claim 19, wherein the lens assembly comprises three lenses.

25. The optical system as recited in claim 19, wherein the lens assembly comprises a negative power lens disposed intermediate two positive power lenses.

26. The optical system as recited in claim 19, wherein the lens assembly comprises a first lens, a second lens, and a third lens having parameters that are approximate to the following:
first lens:
index of refraction: 1.755;
V-Number: 52.3228;
radius of curvature of first surface: 2.664 mm;
diameter of first surface: 3.000 mm;
radius of curvature of second surface: −14.091 mm;
diameter of second surface: 3.000 m;
second lens:
index of refraction: 1.69895;
V-Number: 30.0505;
radius of curvature of first surface: −3.895 mm;
diameter of first surface: 3.000 mm;
radius of curvature of second surface: 2.830 mm;
diameter of second surface: 3.000 mm;
third lens;
index of refraction: 1.755;
V-Number: 52.3228;
radius of curvature of first surface: 6.128 mm;
diameter of first surface: 3.000 mm;
radius of curvature of second surface: −3.319 mm; and
diameter of second surface: 3.000 mm.

27. The optical system as recited in claim 19, wherein the lens assembly comprises a first lens, a second lens, and a third lens having parameters that are approximate to the following:
first lens:
index of refraction: 1.755;
V-Number: 52.3228;
radius of curvature of first surface: 2.390 mm;
diameter of first surface: 2.900 mm;
radius of curvature of second surface: −14.108 mm;
diameter of second surface: 2.900 mm;
second lens:
index of refraction: 1.69895;
V-Number: 30.0505;
radius of curvature of first surface: −3.837 mm;
diameter of first surface: 2.900 mm;
radius of curvature of second surface: 2.371 mm;
diameter of second surface: 2.900 mm;
third lens;
index of refraction: 1.755;
V-Number: 52.3228;
radius of curvature of first surface: 4.544 mm;
diameter of first surface: 2.900 mm;
radius of curvature of second surface: −3.068 mm; and
diameter of second surface: 2.900 mm.

28. The optical system as recited in claim 19, wherein light passes through the single lens before passing through the lens assembly.

29. The optical system as recited in claim 19, wherein light passes through the lens assembly before passing through the single lens.

30. The optical system as recited in claim 19, wherein the single movable lens moves in response to an auto focus of the camera.

31. A miniature camera comprising:
a movable lens assembly comprising a plurality of lens elements;
a movable single lens;
wherein one of the lens assembly and the single lens is moved and then fixed in a position that enhances a resolution of the camera and the other of the lens assembly and the single lens moves so as to effect focusing of the camera; and
wherein the single lens and the lens assembly are independently movable with respect to one another.

32. The miniature camera as recited in claim 31, wherein the lens assembly is fixed in position and the single lens moves so as to effect focusing of the camera.

33. A personal electronic device comprising:
a movable lens assembly comprising a plurality of lens elements;
a movable single lens;
wherein one of the lens assembly and the single lens is moved and then fixed in a position that enhances a resolution of a camera and the other of the lens assembly and the single lens moves so as to effect focusing of the camera; and
wherein the single lens and the lens assembly are independently movable with respect to one another.

34. The personal electronic device as recited in claim 33, wherein the lens assembly is fixed in position and the single lens moves so as to effect focusing of the camera.

35. The personal electronic device as recited in claim 33, wherein the personal electronic device comprises a device selected from the group consisting of:
a cellular telephone;
a personal digital assistant (PDA);
a laptop computer;
a notebook computer; and
a pocket personal computer.

* * * * *